Aug. 7, 1923.
F. P. MANSBENDEL
1,464,184
ELECTRIC MOTOR
Filed March 31, 1921
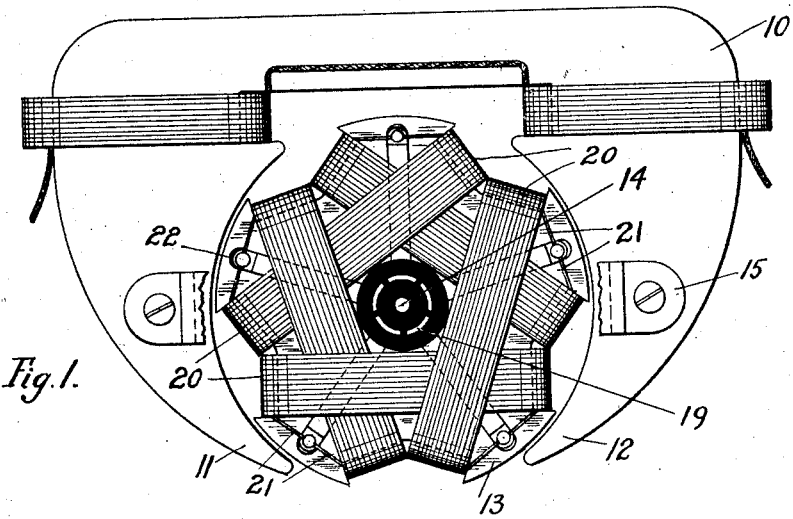
Fig. 1.
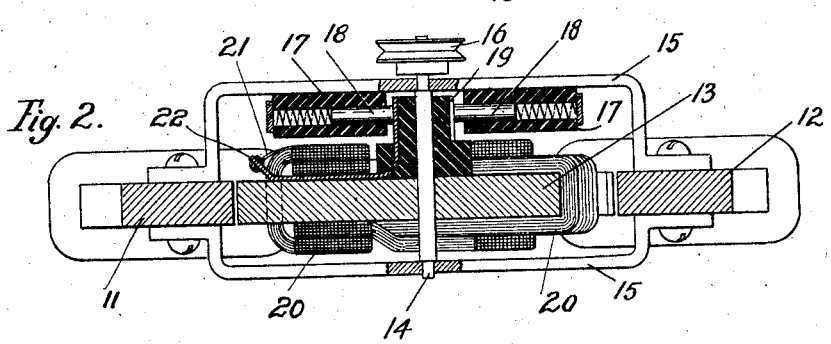
Fig. 2.
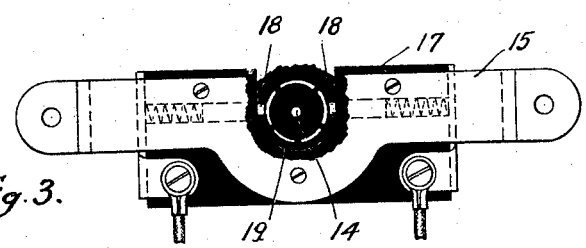
Fig. 3.
Fritz P. Mansbendel
INVENTOR
BY 
ATTORNEY Patented Aug. 7, 1923.

1,464,184

UNITED STATES PATENT OFFICE.

FRITZ P. MANSBENDEL, OF BROOKLYN, NEW YORK.

ELECTRIC MOTOR.

Application filed March 31, 1921. Serial No. 457,443.

*To all whom it may concern:*

Be it known that I, FRITZ P. MANSBENDEL, a citizen of France and a resident of Brooklyn, in the county of Kings and State of New York, have invented certain new and useful Improvements in Electric Motors, of which the following is a specification.

The invention relates to an electric motor construction; and it has for its object to provide a flat type of electric motor suitable for use where a restriction in the axial direction is imposed, for example, as in connection with the rotation of a display turntable or advertising device such as is set forth in a co-pending application for U. S. Letters Patent, filed by me of even date herewith, Serial No. 457,441.

The invention has for its object, furthermore, details of construction of the commutator and the manner of winding of the armature coils, whereby the thickness of the armature is greatly reduced and the character of winding simplified.

The nature of the invention will best be understood, however, when described in connection with the accompanying drawings, in which—

Fig. 1 is a plan view of the improved motor with a portion broken away.

Fig. 2 is a vertical section thereof.

Fig. 3 is a fragmentary plan.

Similar characters of reference designate corresponding parts thruout the several views.

Referring to the drawings, 10 designates a field magnet, preferably flat, which may be composed of laminated or solid material and having the poles 11 and 12 between which an armature 13 is arranged to rotate. The latter is in the nature of a slotted thin drum member mounted upon a shaft 14 which, in turn, rotates in suitable bearings of bracket members 15. Shaft 14, furthermore, may be provided with a pulley 16 for outside connection; or power may be otherwise transmitted from the motor. The members 15 may be carried by the field magnet 10, being located upon the opposite sides of the armature; and one member is designed to carry suitable brush holders 17 for spring-urged brushes 18 which bear upon the segments of a commutator 19 of the motor.

The commutator 19 is specially constructed, as hereinafter more fully set forth, to facilitate the attachment of the armature windings thereto. The latter are also of a particularly simple nature, being wound with a continuous wire in the open slots of the armature drum 13 and without necessitating threading. As shown, the said windings consist of a series of straight coils 20 wound one over part of another, in succession, the leads 21 between successive coils being located substantially at the circumference of the armature.

The coils 20 are connected to the commutator 19 in manner following. The commutator itself is composed of a plurality of punched-out L-shape strips which are held together preferably by means of moulded insulating material; and the inner or shorter ends of these strips are curved cylindrically to provide the segments of the commutator. The outer or longer extensions of the commutator segments are continued radially outward under the coils 20 and the tip ends 22 thereof preferably bent at an angle to afford convenient and accessible portions for soldering the circumferential leads 21 between the coils. By this expedient, it is not necessary to bring a lead 21 to the central portion of the armature for connection to the commutator segment, as has been the general practice. Moreover, in being enabled to make the connection at the circumference of the armature, the coils may be wound with a continuous wire in the simple manner indicated, thus avoiding crossing or twisting the leads of the coils which would result in greatly increased thickness of the armature and which in the present instance it is desirable to obviate.

I claim:—

1. An electric motor, comprising a field magnet, a thin drum armature mounted for rotation between the poles thereof, and a commutator for said armature having segments with extensions which are continued radially beyond and under the armature coils, the leads between the coils being electrically connected to the outer ends of said extensions.

2. An electric motor, comprising a field magnet, a thin drum armature mounted for rotation between the poles thereof, and a commutator consisting of a plurality of strips bent up at the inner end to provide commutator segments which are anchored in an insulation block occupying the available free space in the center of the armature coils, said strips having extensions which are continued radially outward and under the said armature coils, the outer ends of said extensions being electrically connected to said coils substantially at the circumference of the armature.

Signed at New York in the county of New York and State of New York this 30th day of March, A. D. 1921.

FRITZ P. MANSBENDEL.